United States Patent
Suhle

[19]

[11] Patent Number: 6,116,837
[45] Date of Patent: Sep. 12, 2000

[54] RING-SHAPED SAFETY ELEMENT

[75] Inventor: Karl Georg Suhle, Minden, Germany

[73] Assignee: Bertrand Faure Sitztechnik GmbH & Co. KG, Stadthagen, Germany

[21] Appl. No.: 09/068,078

[22] PCT Filed: Aug. 8, 1997

[86] PCT No.: PCT/EP97/04321

§ 371 Date: May 4, 1998

§ 102(e) Date: May 4, 1998

[87] PCT Pub. No.: WO98/22723

PCT Pub. Date: May 28, 1998

[30] Foreign Application Priority Data

Nov. 18, 1996 [DE] Germany ............................ 196 47 589

[51] Int. Cl.$^7$ ............................ F16B 19/00; F16B 21/18
[52] U.S. Cl. ........................ 411/508; 411/353; 411/526; 411/913
[58] Field of Search ..................................... 411/352, 353, 411/508, 509, 525, 526, 527, 913

[56] References Cited

U.S. PATENT DOCUMENTS

| | | | |
|---|---|---|---|
| 1,083,697 | 1/1914 | Neptune | 411/525 X |
| 2,342,910 | 2/1944 | Tinnerman | 411/525 X |
| 2,887,891 | 5/1959 | Perez | 74/340.3 |
| 3,050,097 | 8/1962 | Cochran | 411/913 X |
| 4,810,145 | 3/1989 | Villas | 411/525 X |
| 5,022,875 | 6/1991 | Karis | 440/49 |

FOREIGN PATENT DOCUMENTS

| | | |
|---|---|---|
| 489665 | 3/1919 | France . |
| 2 594 910 | 8/1987 | France . |
| 10 907 | 2/1880 | Germany . |

*Primary Examiner*—Neill Wilson
*Attorney, Agent, or Firm*—Pollock, Vande Sande & Amernick, R.L.L.P.

[57] ABSTRACT

An annular locking element is provided for engaging a cylindrical object to lock the object to a plate. The locking element comprises a circular element region formed to be an interrupted circle and being adapted to engage a first contact surface on the cylindrical object. A plurality of spring tongues extends radially from the element region and are bent outwardly from the element region. A plurality of support elements also extend from the element region and are adapted to engage a second contact surace on the cylindrical object.

15 Claims, 8 Drawing Sheets

6,116,837

RING-SHAPED SAFETY ELEMENT

FIELD OF THE INVENTION

The invention relates to an annular locking element for engaging a cylindrical object, such as a shaft, and holding (locking) the cylindrical object to a corresponding region having a hole, such as a plate.

BACKGROUND OF THE INVENTION

Known locking elements are designed as flat washers with an exterior, circular cylindrical area, from which spring tongues extend radially to the center of the circular area. The spring tongues, which are spaced apart, leave a diametrical region in the center of the washer open, through which a fitting shaft to be locked can be slid. Such locking elements, punched out of spring steel, can be used for the purpose of locking, when placed around the fitting shaft, which, for example, is slid through a fitting passage borehole of a counter region.

In order to mount the known locking element on the fitting shaft, the locking element must, in principle, be slid on the shaft starting from the base of the shaft.

SUMMARY OF THE INVENTION

The invention is designed to provide a locking element, similar to the type known, that can be mounted both at right angles to the longitudinal axis of a curved, circular cylindrical region of the shaft and can be fastened to the shaft, before the circular cylindrical region is inserted through the borehole of the counter region, into its installation or locked position.

The problems of the prior art are solved by the present invention, which comprises an annular locking element for engaging a cylindrical object to lock the object to a plate or other corresponding region. The locking element comprises a circular element formed to be an interrupted circle, that is, there is a part of the circle missing, which is adapted to engage a first contact surface on the cylindrical object. A plurality of spring tongues extend radially from the circular element and are bent outwardly from the center of the circular element. A plurality of support elements also extend from the circular element and are adapted to engage a second contact surface on the cylindrical object.

The annular locking element is slid on a circular cylindrical region of the shaft or cylindrical object from the side and is then fastened on the circular cylindrical region. The first and second contact surfaces of the circular cylindrical region are formed preferably by the faces of a groove, which runs around the circular cylindrical region.

The groove is, preferably, recessed deep enough so that the circular element lies flush with the outer surface of the shaft. Thus, it is possible to push the locking element, which is slid on the shaft from the side, through a matching opening of a counter region, for example, through a matching bore of a plate, which extends at right angles to the axis of the shaft. In the process of sliding the locking element through the base of the plate, the integral spring tongues are pushed inwardly and, after passing through the borehole, spring radially away from the shaft and return to their original position.

With the present invention, it is possible to arrange the locking element in such a way that, after it passes through the opening in the counter region or plate, the integral spring tongues, which are now spread apart, sit closely against the rear side of the counter region, for example the rear side of the plate, thereby holding the shaft to the plate. However, it is also possible that the spring tongues are not close to the plate, but allow an axial movement between the circular cylindrical region and the counter region, so that the locking element does not serve to lock the regions with respect to one another, but rather only serves to safeguard against extraction of the cylindrical region from the opening.

The locking element, according to the invention, permits not only a fast and uncomplicated assembly, but it also allows a simple disassembly of the cylindrical region and the plate. Without destroying the locking element, disassembly is accomplished simply by pushing or pulling the locking element off towards the side.

BRIEF DESCRIPTION OF THE DRAWINGS

In the following a preferred embodiment of the invention is described in detail with reference to the drawings.

In the drawings, the same or otherwise corresponding parts are provided with the same reference numerals.

DETAILED DESCRIPTION OF THE PREFERRED EMBODIMENT(S)

The annular locking element is first described with reference to FIGS. 1 to 4. The entire locking element, designated with the number 3, comprises a circular shaped element 3a, which forms an incomplete circle, with a quarter is missing, for example, to complete a complete circular cylindrical ring. Thus, the circular element 3a is designed to be interrupted. The locking element has several spring tongues 3b, which are bent down radially toward the outside forming an obtuse angle α with the circular element 3a. In addition, support regions 3c, which are designed as tongues or flaps, extend from the circular element 3a.

Figure 3:
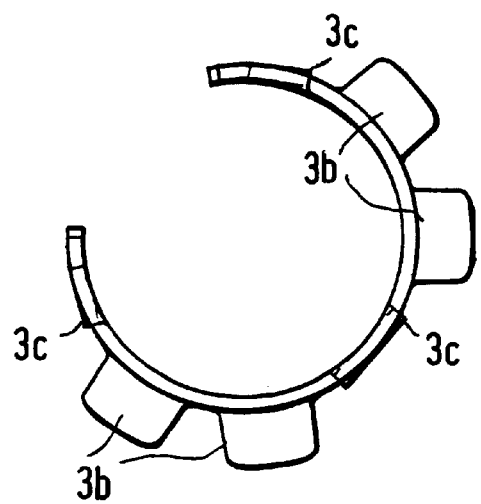
FIG. 3 is a bottom view of the locking element along line III in FIG. 2.
Figure 4:
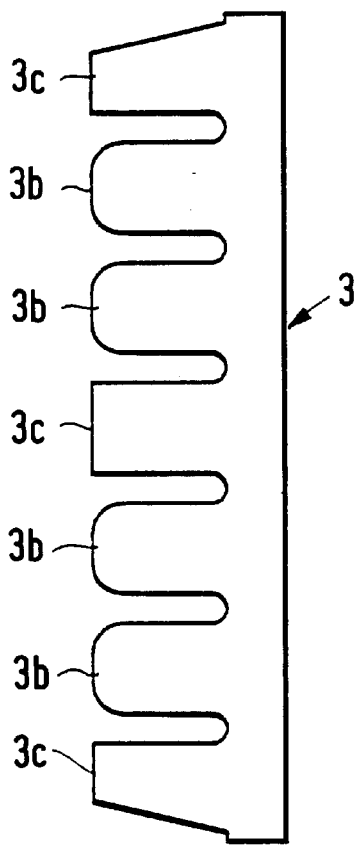
FIG. 4 is a side view of an unwound locking element, according to FIG. 1.
Figure 2:
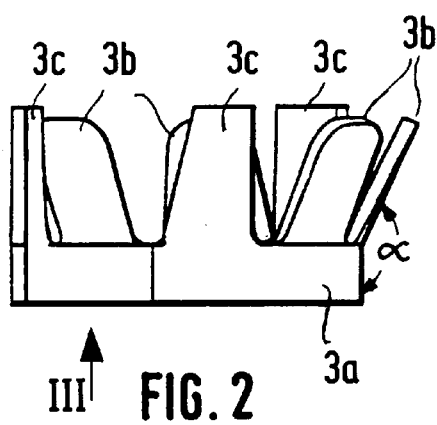
FIG. 2 is a side view of the locking element, according to FIG. 1.
Figure 1:
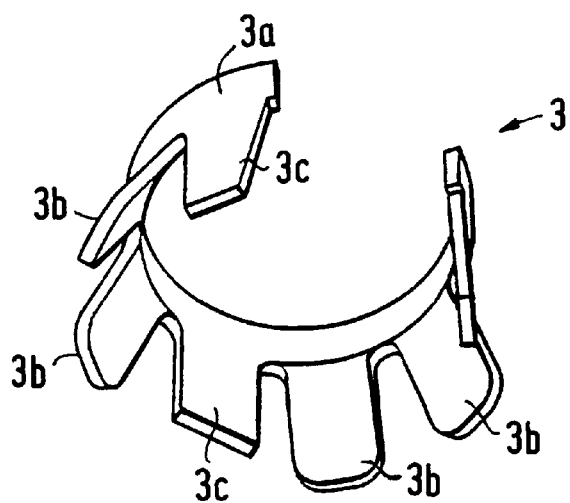
FIG. 1 is a perspective view of a first embodiment of the locking element.
Figure 4A:
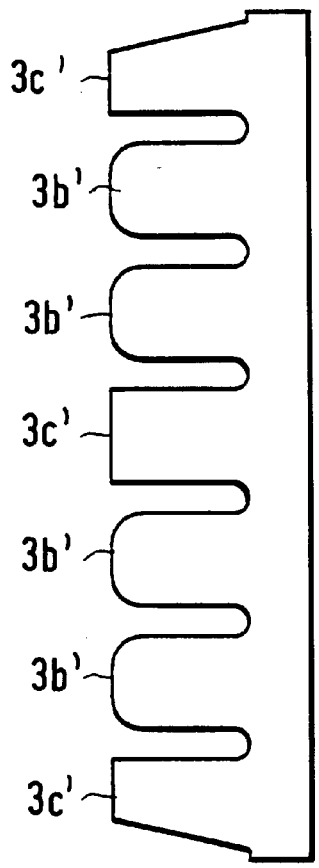
FIG. 4a is an illustration of a second embodiment, corresponding to FIG. 4.
Figure 3A:
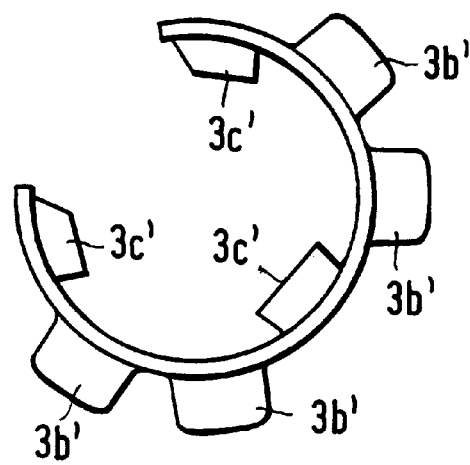
FIG. 3a is an illustration of a second embodiment, corresponding to FIG. 3.
Figure 2A:
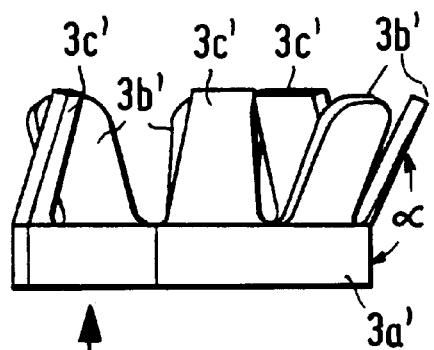
FIG. 2a is an illustration of a second embodiment, corresponding to FIG. 2.
Figure 1A:
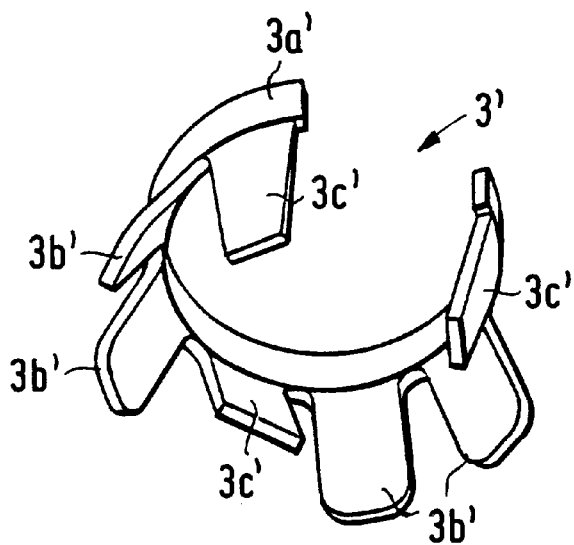
FIG. 1a is an illustration of a second embodiment, corresponding to FIG. 1.
Figure 3B:
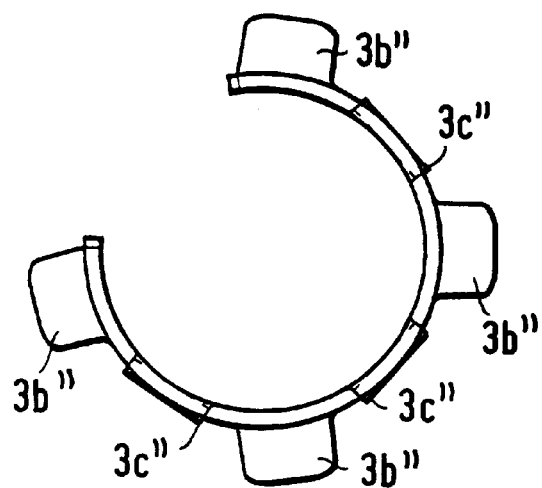
FIG. 3b is an illustration of a third embodiment, corresponding to FIG. 3.
Figure 4B:
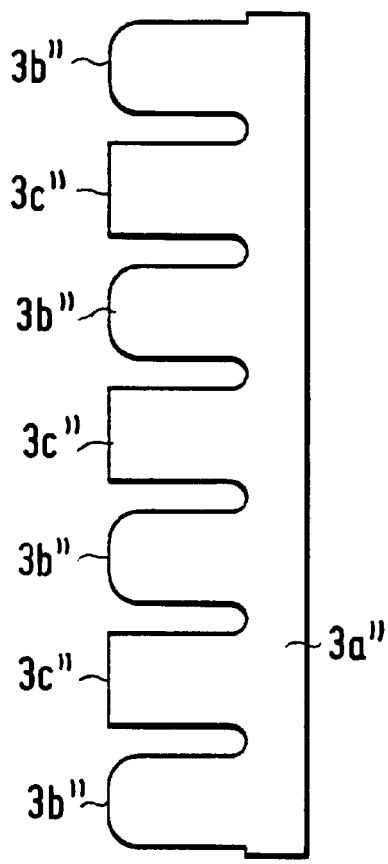
FIG. 4b shows a third embodiment, corresponding to FIG. 4.
Figure 2B:
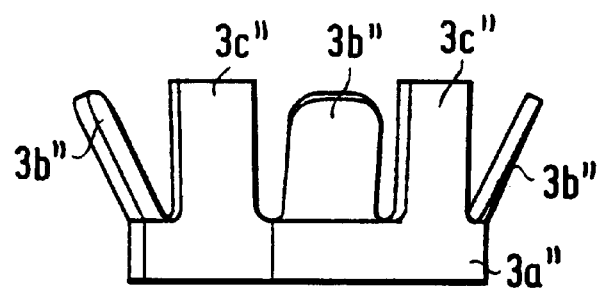
FIG. 2b is an illustration of a third embodiment, corresponding to FIG. 2.
Figure 1B:
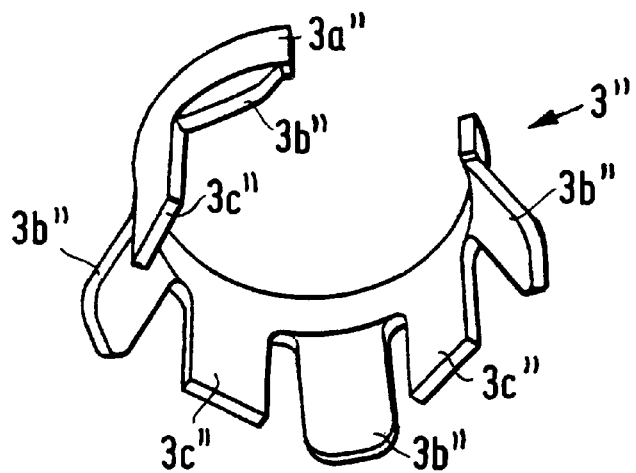
FIG. 1b is an illustration of a third embodiment, corresponding to FIG. 1.

In the first embodiment, illustrated in FIG. 1, there are a total of three support regions 3c, designed as tongues or flaps, and a total of four spring tongues 3b. The support regions 3c are not turned or bent down with respect to the circular element 3a and are aligned with the outer surface of the circular element 3a.

The second embodiment, shown in FIGS. 1a to 4a, differs from the first embodiment only in that in the second embodiment the support regions 3c', which are also designed as tongues or flaps, are bent towards the center of the region defined by the circular element 3a'. Otherwise, the design of the second embodiment, all of which is designated as 3', is the same as the first embodiment.

The third embodiment, shown in FIGS. 1b to 4b, substantially corresponds to the first embodiment shown in FIGS. 1 to 4. Only the position of the support regions 3c". designed as tongues or flaps, and the spring tongues 3b", are changed with respect to the first embodiment. The support regions 3c" and spring tongues 3b" are arranged alternatingly on the circular element 3a".

Figure 5:
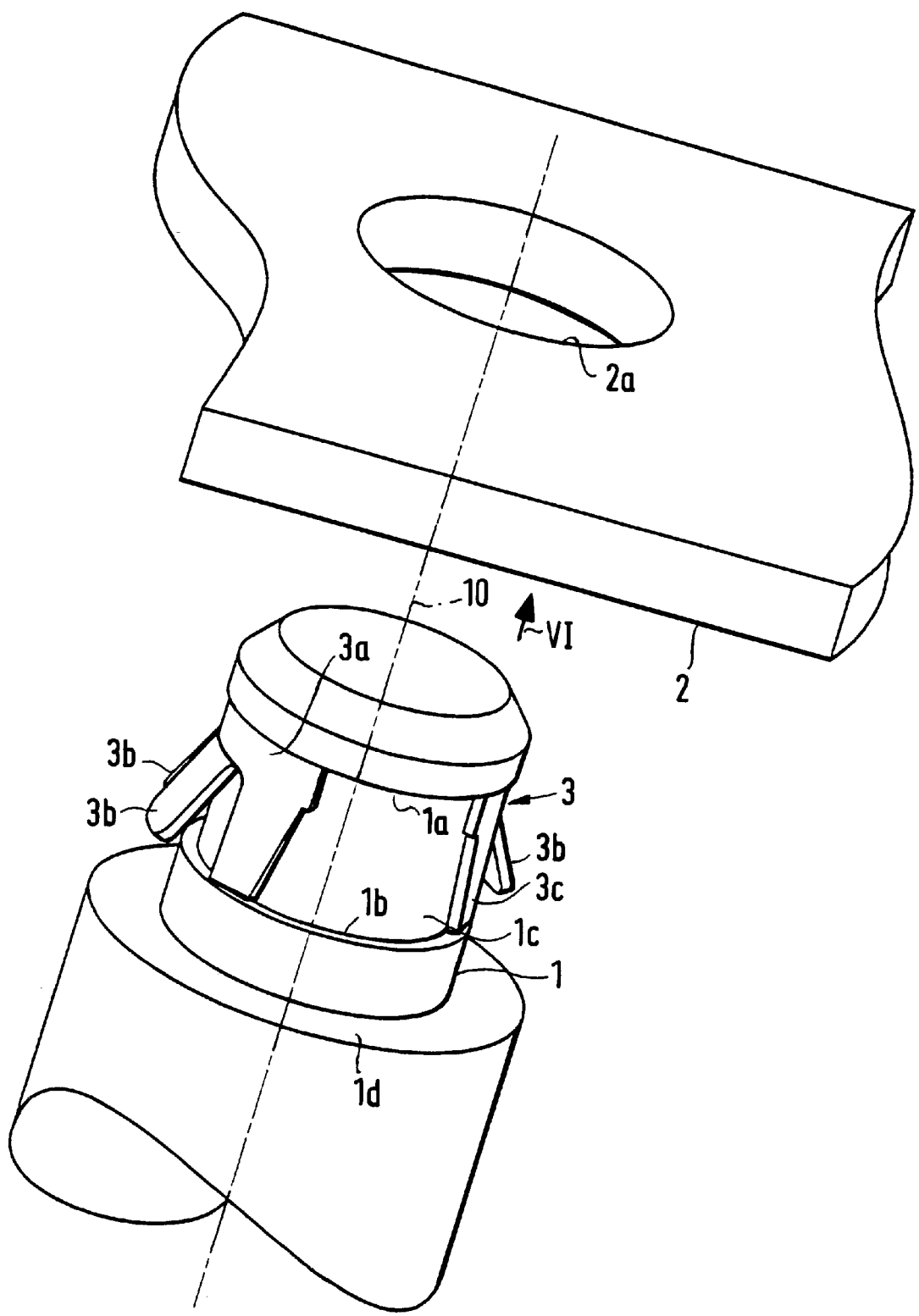
FIG. 5 is an enlarged perspective view of two parts to be put locked together with a locking element, according to FIG. 1.

In FIG. 5 there is illustrated a circular cylindrical region 1, which is part of a shaft end. The circular cylindrical region 1 has a groove 1c around its circumference. The groove 1c has faces which serve as contact surfaces 1a or 1b for the locking element 3. The front edge of the circular element 3a rests against the contact surface 1a. The support regions 3c, designed as flaps, rest against the contact surface 1b. The locking element 3 is installed by sliding the locking element at a right angle to the axis of symmetry 10 of the cylindrical region and onto the bottom of the groove 1c. The outer contour of the support regions 3c and the outer contour of the circular region 3a are aligned within the outer contour of the circular cylindrical region 1 to form a substantially even surface, i.e., lie flush in the groove. Only the spring tongues 3b, which are spread apart outwardly from the circular element 3a, project beyond the outer contour of the circular cylindrical region 1.

Figure 6:
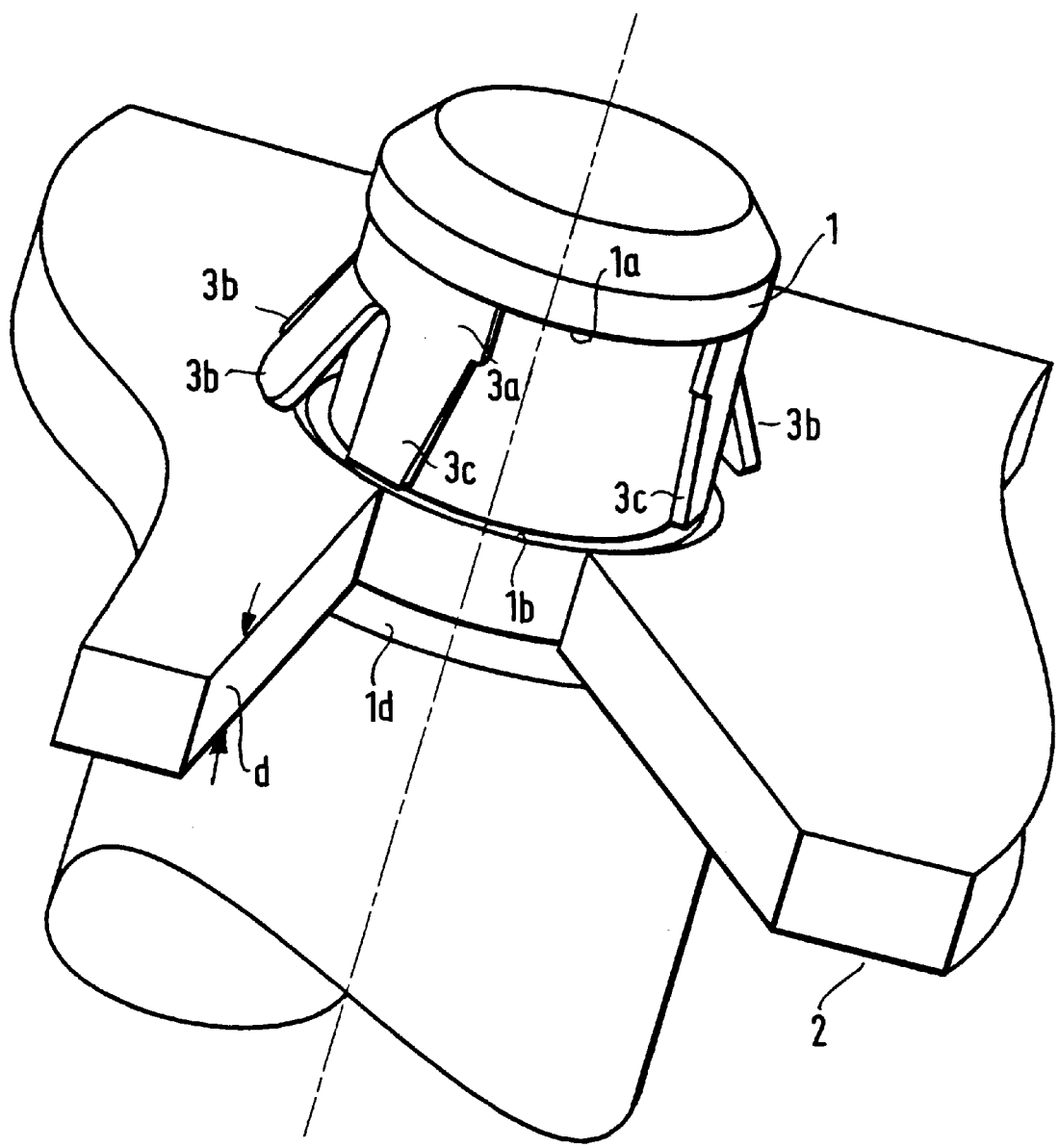
FIG. 6 shows the two parts, according to FIG. 5, in the assembled position, wherein a segment of the plate-shaped counter region, illustrating the passage borehole, is shown as partially cut away.

The diameter of the circular cylindrical region 1 corresponds to the diameter 2a of a borehole in a corresponding region 2, designed as a plate 2. The circular cylindrical region 1 is slid through the borehole 2a in the direction of the arrow VI, shown in FIG. 5, until the shoulder 1d of the shaft end rests against the underside of plate 2. In the embodiment shown in FIG. 6, the distance between the shoulder 1d and the contact surface 1b for the support regions 3c is approximately equivalent to the thickness d of the plate 2. The plate 2 when in its locked position, shown in FIG. 6, is secured by the locking element 3 so as not to shift on the shaft in the axial direction because the spring tongues 3b engage the plate 2 next to the borehole 2a and the shoulder 1d engages the underside of the plate 2.

Figure 7:
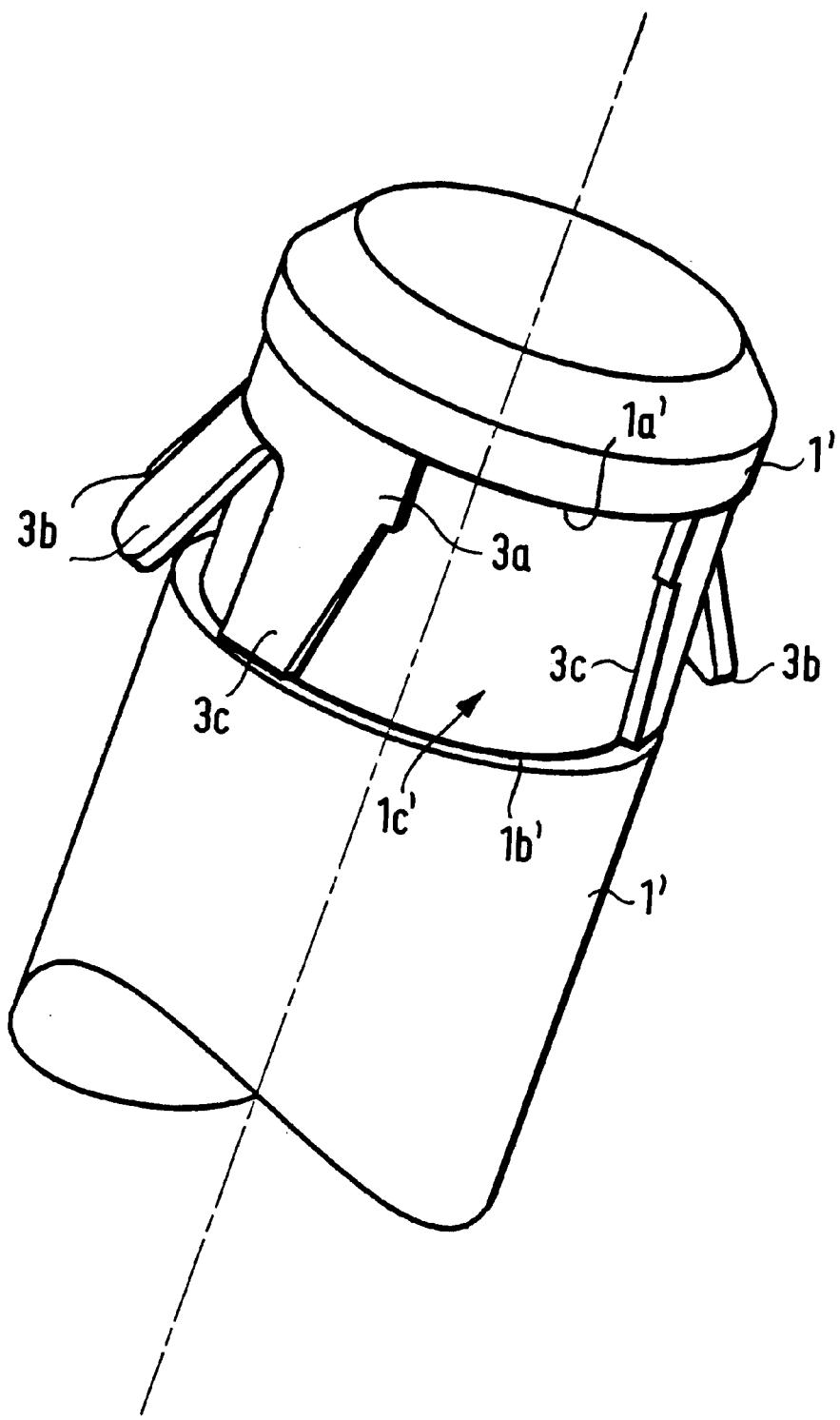
FIG. 7 is a perspective view of a shaft end with a locking element, according to FIG. 1.

FIG. 7 shows an embodiment in which the circular cylindrical region 1' is designed as a shaft end without a shoulder 1d and only with a groove 1c' with the two contact surfaces 1a' and 1b'. The locking element 3 is installed into this groove 1c' in the same manner as described above. The lack of a shoulder 1d allows the shaft end to move in an axial direction relative to a plate.

The embodiment shown in FIG. 7 does not fix the shaft end to a plate (not illustrated), but rather only safeguards against the shaft end being extracted or pulled out from the plate.

Figure 8:
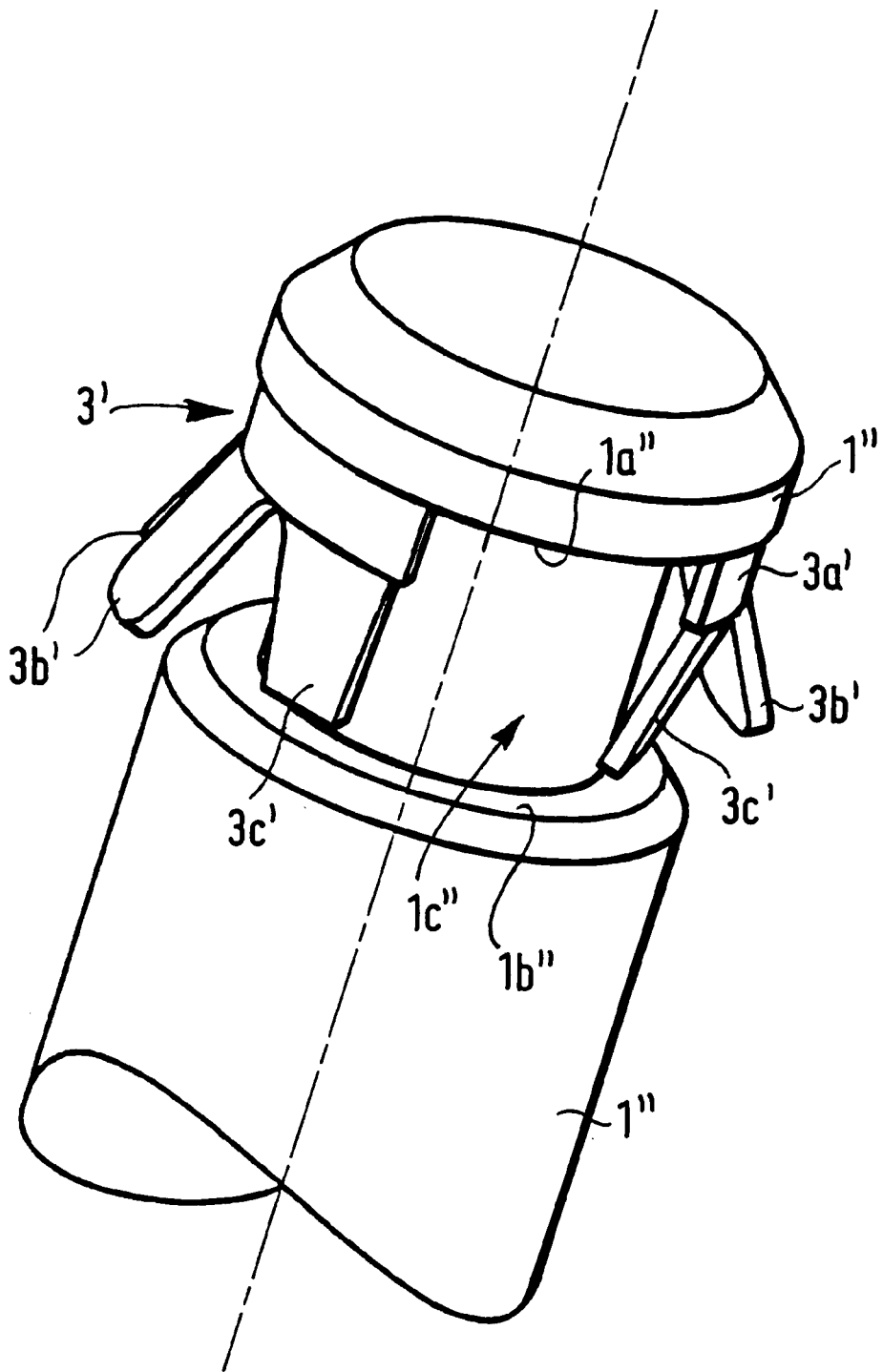
FIG. 8 is a perspective view of a shaft end with a locking element, according to FIG. 1a, and FIG. 9 is a perspective view of a shaft end with a locking element, according to FIG. 1b.

FIG. 8 illustrates another circular cylindrical region 1", which is designed as a shaft end without a shoulder and with a circumferential groove 1c", which is deeper than the groove 1c' of the embodiment shown in FIG. 7. The locking element of the second embodiment, which is labelled as 3' and which is depicted in FIGS. 1a to 4a, is installed into this deeper groove.

The support regions 3c' are bent radially toward the inside of the locking element and rest against the floor of the groove 1c". Thus, in this embodiment the circular element 3a' is arranged at a radial distance from the base of the groove 1c".

Figure 9:
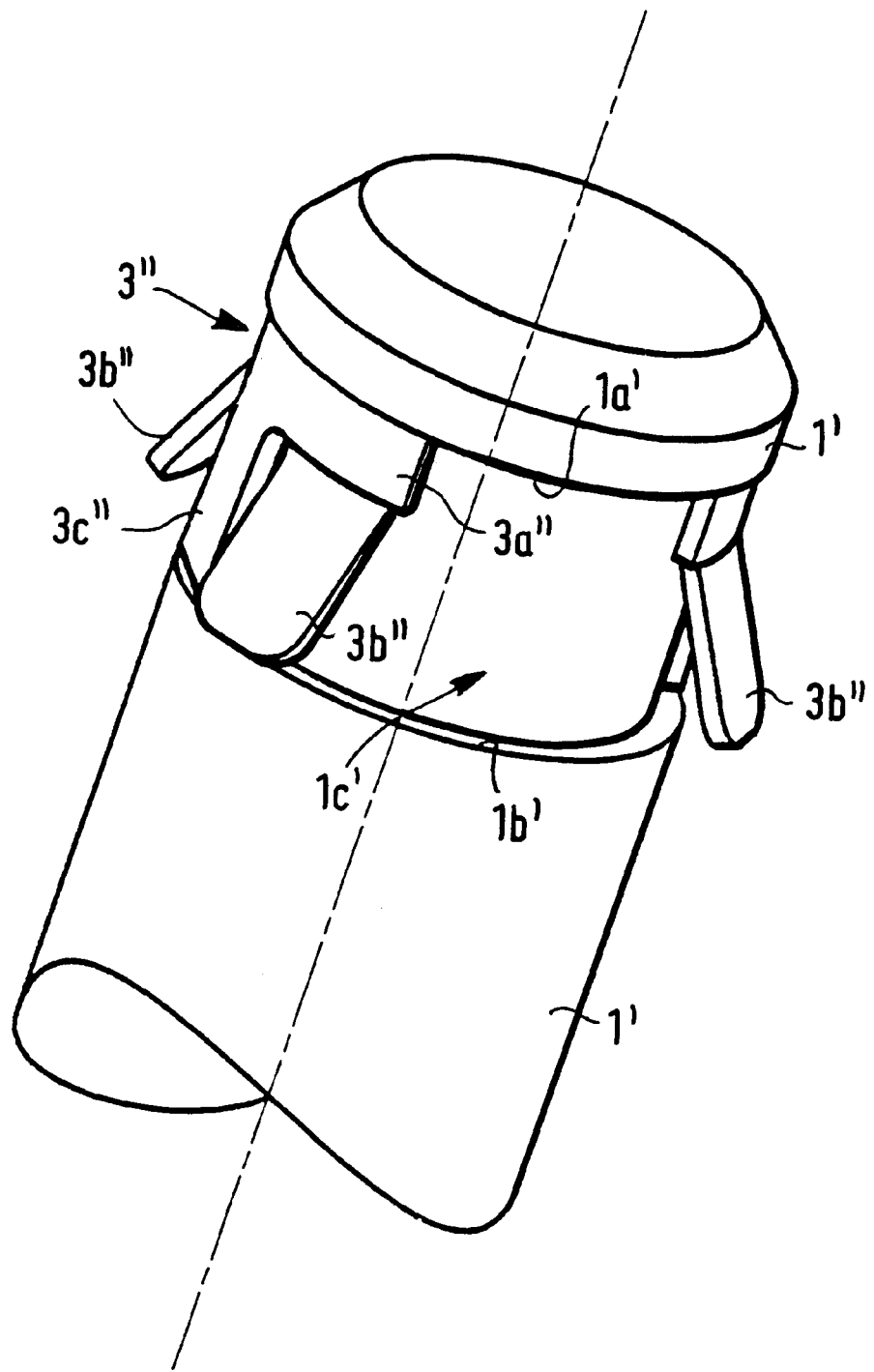

FIG. 9 illustrates an embodiment with a circular cylindrical region 1", which matches the circular cylindrical region shown in FIG. 7. The only difference with respect to FIG. 7 is, in FIG. 9, the design of the locking element, which is marked with the reference numeral 3", is the third embodiment illustrated in FIGS. 1b to 4b.

While preferred embodiments of the invention has been described above, since variations will be apparent to those skilled in the art, the invention should not be construed as limited to the specific embodiments described above, but is set forth in the claims.

What is claimed is:

1. An annular locking element for engaging a cylindrical object to lock said object to a counter region, said locking element comprising:
   a circular element formed to be an interrupted circle and adapted to engage a first contact surface on said cylindrical object;
   a plurality of spring tongues extending radially from said element region and bent outwardly from said circular element; and
   a plurality of second spring tongues extending from said circular element and bent radially towards the inside of said circular element, said support elements being adapted to engage a second contact surface on said cylindrical object.

2. The locking element of claim 1 wherein said cylindrical object defines a groove around its circumference, said first contact surface being a first wall of said groove and said second contact surface being a second wall of said groove, whereby said circular element and said second spring tongues engage said first and second contact surfaces, respectively, to hold said locking element in said groove.

3. The locking element of claim 1, wherein said spring tongues and said second spring tongues are integral with said circular element.

4. The locking element of claim 1 wherein said second spring tongues extend substantially in the axial direction of said circular element.

5. The locking element of claim 1 wherein said spring tongues and said second spring tongues are uniformly distributed along said circular element.

6. An annular locking element for engaging a cylindrical object to lock said object to a counter region, said locking element comprising:
   a circular element formed to be an interrupted circle and adapted to engage a first contact surface on said cylindrical object;
   a plurality of spring tongues extending radially from said element region and bent outwardly from said circular element; and
   a plurality of support elements extending from said circular element, said support elements being adapted to engage a second contact surface on said cylindrical object and are formed at both ends of the circular element.

7. The locking element of claim 6 wherein said cylindrical object defines a groove around its circumference, said first contact surface being a first wall of said groove and said second contact surface being a second wall of said groove, whereby said circular element and said support elements engage said first and second contact surfaces, respectively, to hold said locking element in said groove.

8. The locking element of claim 6, wherein said spring tongues and said support elements are integral with said circular element.

9. The locking element of claim 6 wherein said support elements extend substantially in the axial direction of said circular element.

10. The locking element of claim 6 wherein said spring tongues and said support elements are uniformly distributed along said circular element.

11. The combination of an annular locking element and a cylindrical object including:

said cylindrical object defining a groove around its circumference, said groove having a rectangular profile with a cylindrical base of smaller diameter adjacent outer surfaces of said cylindrical object, said groove having first and second side walls substantially parallel to each other and arranged transverse to a longitudinal axis of said cylindrical object, said first side wall being a first contact surface and a second side wall being a second contact surface; and said locking element comprising:

a circular element formed to be an interrupted circle and adapted to engage said first contact surface on said cylindrical object;

a plurality of spring tongues extending radially from said element region and bent outwardly from said circular element; and a plurality of support elements extending from said circular element, said support elements being adapted to engage said second contact surface on said cylindrical object, whereby the engagement of the circular element and said support elements with the first and second contact surfaces, respectively, hold the locking element in said groove.

12. The combination of claim 11 wherein said circular element has a rectangular profile, a long side of said profile being parallel to said axis.

13. The combination of claim 12 wherein a long, inner side of said rectangular profile engages said cylindrical base.

14. The combination of an annular locking element, a plate and a cylindrical object: said locking element comprising:

a circular element formed to be an interrupted circle and engaging a first contact surface on said cylindrical object;

a plurality of spring tongues extending radially from said element region and bent outwardly from said circular element;

a plurality of support elements extending from said circular element, said support elements engaging a second contact surface on said cylindrical object, whereby the engagement of the circular element and said support elements with the first and second contact surfaces, respectively, hold the locking element near an end of the cylindrical element; and a plate defining a borehole, said borehole having a diameter corresponding to a diameter of said end of said cylindrical object, said cylindrical element with said locking element protruding through said borehole, said spring tongues being arranged on one side of said plate and a shoulder of said cylindrical object, having a diameter larger than that of the borehole, arranged on an opposite side of said plate.

15. The combination of claim 14 wherein said cylindrical object defines a groove around its circumference, said groove having a rectangular profile with a cylindrical base of smaller diameter the adjacent outer surfaces of said cylindrical object, said groove having first and second side walls substantially parallel to each other and arranged transverse to a longitudinal axis of said cylindrical object, said first side wall being a first contact surface and a second side wall being a second contact surface.

* * * * *